Figure 1:
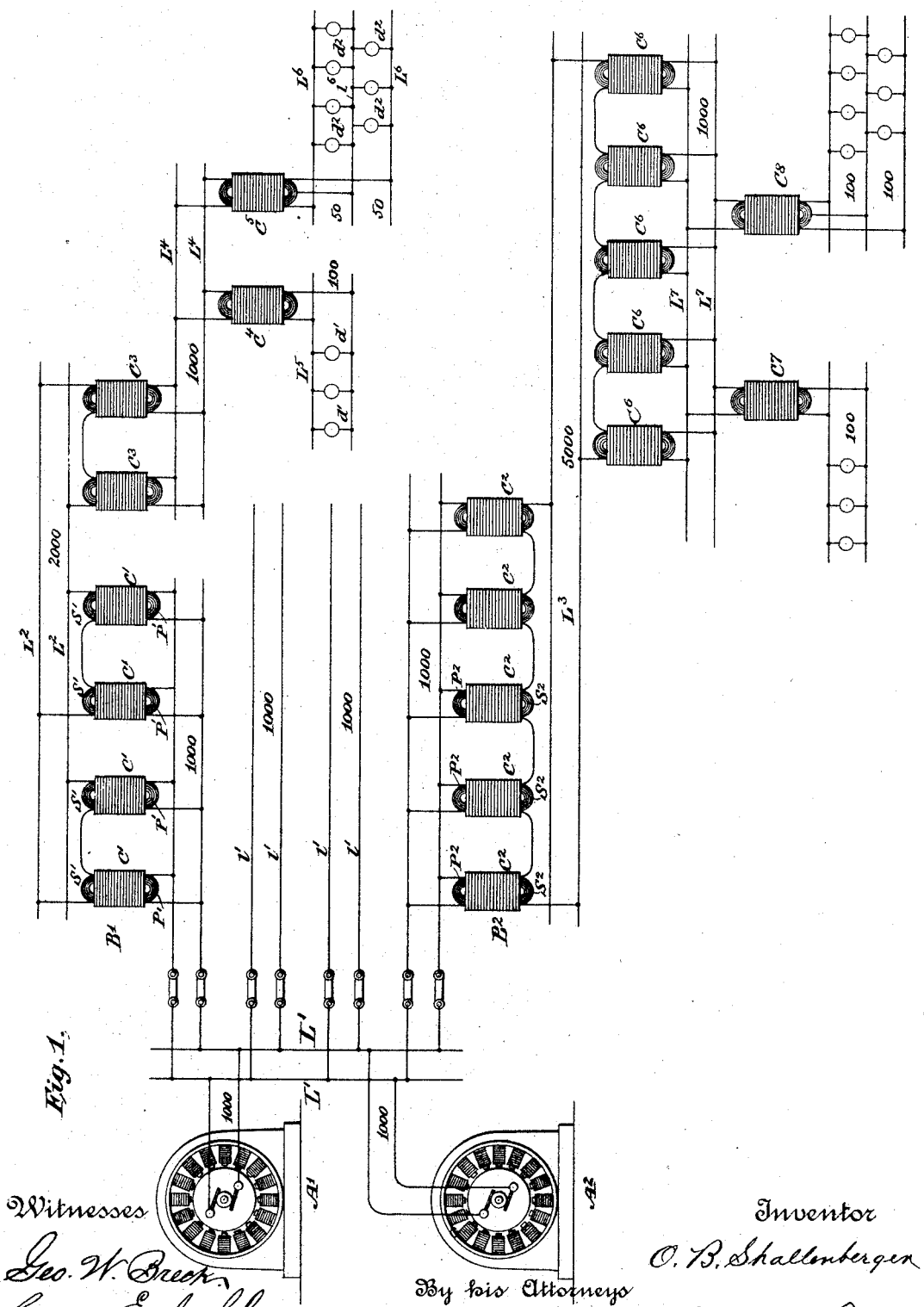

UNITED STATES PATENT OFFICE.

OLIVER B. SHALLENBERGER, OF ROCHESTER, PENNSYLVANIA.

SYSTEM OF ELECTRICAL DISTRIBUTION.

SPECIFICATION forming part of Letters Patent No. 503,621, dated August 22, 1893.

Application filed March 3, 1887. Serial No. 229,535. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Systems of Electrical Distribution, of which the following is a specification.

The invention relates to a method of supplying electric currents from any convenient source of electricity and conveying the same in an economical and convenient manner to translating devices to be operated thereby.

The general plan of the invention is to generate currents of such potential as may be economically produced, and to then increase the potential to such a degree as to render it possible to transmit a large amount of electrical energy over conductors of small cross-section, and to subsequently reduce the potential of these currents, at or near the points where they are to be consumed, to such a degree as may be desired, for operating the special translating devices.

The invention relates particularly to the sub-division of the converters into units in which the difference of potential is a fractional part of the high electro-motive force maintained on the distribution circuit, the object being to reduce as far as possible any danger of destruction of coils from insufficient insulation, and to obtain different conversion ratios from coils of some fixed ratio.

In carrying out the invention it is usually preferred to construct the converters according to a standard of conversion. A very convenient plan is to construct the two coils alike. Thus if they are to be employed upon a thousand-volt circuit, they are constructed to receive at the primary terminals, currents having a difference of potential of one thousand volts and to deliver at the secondary terminals approximately the same difference of potential. It is evident that the secondaries may be connected in various different manners, with the secondary circuit, and thus the currents delivered from their respective coils may be added to each other in such manner as to produce any required difference of potential upon the secondary circuit. The general plan is to connect the primary coils in the generating circuit in multiple-arc with each other, or to connect groups of the same in multiple arc with each other. More or less of the secondary coils of the converters are connected in series in the secondary or transmitting circuit which is designed to convey currents of high potential. At the distant points the potential may be reduced by reversing the connection just described, or by means of converters constructed to reduce the potential. It should be observed that the secondaries of any group, whose primaries are connected in series, should feed into a common circuit so that the primary current is at all times equal throughout the group, for it will be understood that the secondary coils must be so connected as to divide the work equally between them.

Figure 2:
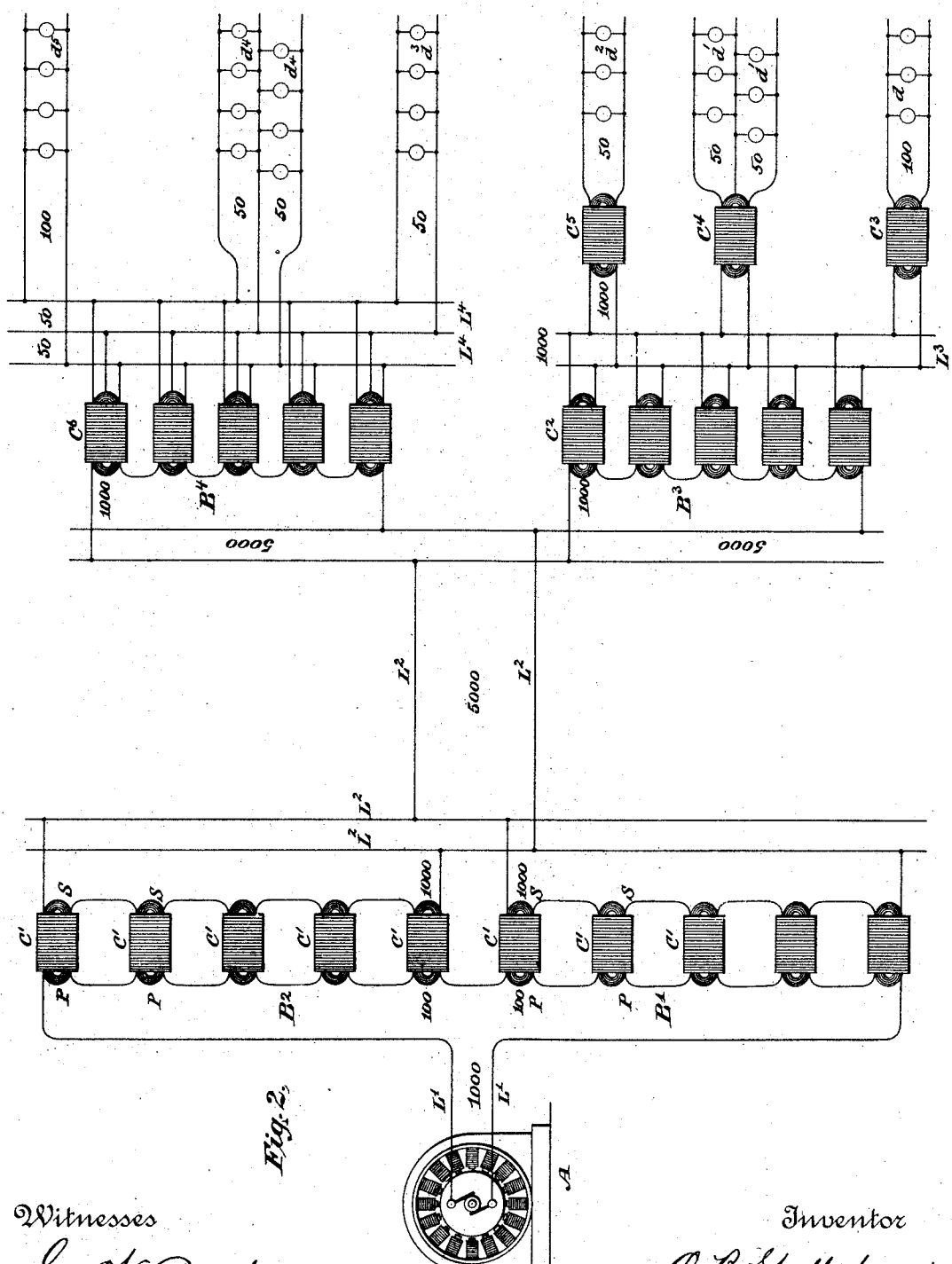

In the accompanying drawings, Figure 1 is a diagram showing the general organization of circuits. Fig. 2 illustrates a modification.

Referring to Fig. 1, $A'$ $A^2$ represent suitable generators delivering alternating or intermittent currents, of say one thousand volts, upon a conductor $L'$, $L'$. This conductor leads from one pole to the other of the generators and includes in multiple arc the primary coils $P'$ $P'$ of a series of converters $C'$, $C'$. These are arranged in a group $B'$. In like manner a group $B^2$ of a system of converters $C^2$, $C^2$ have their primary coils $P^2$, $P^2$ connected in circuit. The converters $C'$, $C'$ are constructed with their primary coils $P'$, $P'$, and secondary coils $S'$, $S'$ alike, that is to say, currents of a given potential supplied to the primary coils, will deliver through the secondary coils, currents of approximately the same potential. If the circuit $L'$, $L'$, is supplied with a current of say one thousand volts, there will be delivered by each converter connected with the secondary circuit $L^2$, $L^2$, a current of one thousand volts. By connecting the secondary coils of two of the converters in series with the circuit $L^2$, $L^2$, a current of two thousand volts will be delivered, since the current from the two converters will be added. There are shown in the group, $B'$ two sets of converters coupled in this manner, each delivering currents of two thousand volts. The second series or group, $B^2$, of converters $C^2$, $C^2$ have their primary coils connected in like manner in multiple arc with the circuit L', L', but in this instance five converters have their secondary coils connected in series with the circuit $L^3$, $L^3$, and therefore deliver currents of five thousand volts, it being understood that the primary and secondary coils of the converters bear the ratio of one thousand to one thousand.

Other groups of converters of various different characters may be connected with the circuit L' L' or through conductors l', l', l', l', or translating devices may be operated thereby directly as found desirable. It should be here observed that, in order that currents supplied to the primary coils should be equal, the work performed by the current delivered from the secondary coils should be equally divided between them. This is readily accomplished by connecting them with the same secondary circuit. The currents of high potential thus produced are led through convenient circuits to points where it is desired to again modify the current, as for instance to reduce its potential. Thus the conductors $L^2$, $L^2$ may, at a distant point, have connected therewith, in series with each other, two converters $C^3$, $C^3$, similar to the converters C', C'. The secondary coils of these converters are, however, connected in multiple arc with each other, in a circuit $L^4$, $L^4$ upon which they will deliver currents of one thousand volts. This circuit may in turn supply converters $C^4$ and $C^5$, respectively connected in circuit therewith. The former has its secondary coil connected with a circuit $L^5$, $L^5$ including translating devices d', d'. The converter $C^4$ is preferably constructed to reduce the potential of the currents; thus if the current required for the translating devices is one hundred volts, the converter $C^4$ would have its primary and secondary coils so proportioned as to reduce the current from one thousand to one hundred volts, in a manner well understood. The converter $C^5$ is similarly constructed, with the exception that a third conductor is shown as being led from the neutral point of the secondary coil, to a neutral line $l^6$ between the conductors $L^6$, $L^6$. The translating devices $d^2$, $d^2$ are here designed to be operated by currents of fifty volts.

In connection with the circuit $L^3$, $L^3$ conveying currents of five thousand volts, there is illustrated a group of converters $C^6$, $C^6$ having their primaries arranged in series with each other and their secondaries connected in multiple arc with each other in a circuit $L^7$, $L^7$. These converters are constructed with their primaries and secondaries having a ratio of conversion of one thousand to one thousand, and the circuit $L^7 L^7$ will receive a current of one thousand volts. Such current may be again reduced in the same manner or by means of the independent converters $C^7$, $C^8$, connected in multiple arc and constructed to reduce the potential, as for instance from one thousand volts to one hundred volts, in the manner described with reference to the converters $C^4$ and $C^5$.

In Fig. 2 there is shown an organization in which the groups B' and $B^2$ have their primary coils connected in series with the generator A. The secondaries of the two groups are connected in multiple-arc with with the conductors $L^2$ $L^2$. These converters are constructed with the ratio of one hundred to one thousand. If therefore the generator delivers currents of one thousand volts, the current delivered to the conductors $L^2$ $L^2$ will be five thousand volts. This diagram also shows two methods of reducing the potential. At $B^3$ a group of five converters is shown having their primaries in series and their secondaries in multiple-arc. These converters have primary and secondary coils alike and thus deliver to the circuit $L^3$ currents of one thousand volts. Converters $C^3$, $C^4$, $C^5$ reduce this potential for the translating devices d, d' d' and $d^2$, $d^2$. It may be noted here that the converter $C^4$ is shown as having a third conductor derived from the middle of the secondary coil and translating devices connected between this conductor and the two conductors derived from its terminals.

The group $B^4$ shows a method of converting directly to the lamp circuit, the primary coils being connected in series and the secondaries in multiple-arc with the conductors $L^4$ $L^4$. A third conductor is here shown as having its connections with the central points of the secondary coils and the translating devices $d^4$ $d^4$ are connected between this conductor and the conductors $L^4 L^4$. The translating devices $d^3$ are connected between the third conductor and one of the conductors $L^4$, and the devices $d^4$ are between the two conductors $L^4 L^4$.

I claim as my invention—

1. In a system of electrical distribution, the combination with a circuit supplied with alternating electric currents, of a group of converters having a ratio of conversion of one to one and having their primary coils connected in multiple arc and their secondary coils connected in series, substantially as described.

2. In a system of electrical distribution, the combination with a source of electricity with a group of converters having the primary and secondary coils of equal length, and having the primary coils connected with the source of electricity in multiple arc with each other and a secondary circuit in which the secondary coils of the converters are connected in series.

3. In a system of electrical distribution, the combination with a source of alternating or intermittent electric currents, of a circuit supplied therefrom, electric converters having their primary and secondary coils of approximately equal length and having their primary coils connected with said source in multiple arc with each other, and a secondary circuit with which more or less of the secondary coils of said converters are connected in series and converters connected with said secondary circuit reducing the potential of the currents transmitted therethrough, substantially as described.

In witness whereof I have hereunto subscribed my name this 1st day of March, A. D. 1887.

OLIVER B. SHALLENBERGER.

Witnesses:
ALBERT SCHMID,
W. D. UPDEGRAFF.